(12) United States Patent
Rahn et al.

(10) Patent No.: US 9,537,577 B2
(45) Date of Patent: Jan. 3, 2017

(54) ARBITRARY GRID WAVELOCKING USING DIGITALLY GENERATED OUT-OF-BAND TONES

(71) Applicant: Infinera Corporation, Sunnyvale, CA (US)

(72) Inventors: Jeffrey T. Rahn, Sunnyvale, CA (US); David J. Krause, Nepean (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/514,840

(22) Filed: Oct. 15, 2014

(65) Prior Publication Data

US 2016/0112141 A1    Apr. 21, 2016

(51) Int. Cl.
| | | |
|---|---|---|
| H04B 10/572 | (2013.01) | |
| H04J 14/02 | (2006.01) | |
| G02B 6/12 | (2006.01) | |
| H04B 10/00 | (2013.01) | |

(52) U.S. Cl.
CPC ............. *H04B 10/572* (2013.01); *H04J 14/02* (2013.01)

(58) Field of Classification Search
CPC ...... H04B 10/572; H04B 10/506; H04B 10/25
USPC ................ 398/79, 77, 69, 196, 195
See application file for complete search history.

(56) References Cited

U.S. PATENT DOCUMENTS

| | | | | |
|---|---|---|---|---|
| 6,233,262 B1* | 5/2001 | Mesh | ................ | H01S 5/0687 372/32 |
| 6,369,923 B1* | 4/2002 | Kuo | ................ | H04B 10/504 398/91 |
| 6,370,169 B1* | 4/2002 | Imajuku | ................ | G01J 9/00 372/32 |
| 7,283,694 B2* | 10/2007 | Welch | ................ | B82Y 20/00 372/26 |
| 2002/0048063 A1* | 4/2002 | Jung | ................ | H04J 14/02 398/95 |
| 2003/0072336 A1* | 4/2003 | Senapati | ................ | H01S 5/0687 372/32 |
| 2004/0264977 A1* | 12/2004 | Yap | ................ | G02F 2/02 398/161 |
| 2007/0092177 A1* | 4/2007 | Nilsson | ................ | B82Y 20/00 385/14 |

(Continued)

OTHER PUBLICATIONS

Wikipedia, "Frequency grid," http://en.wikipedia.org/wiki/Frequency_grid, Oct. 22, 2013, 1 page.

(Continued)

*Primary Examiner* — Oommen Jacob
(74) *Attorney, Agent, or Firm* — David L. Soltz

(57) ABSTRACT

A device may insert a set of tones into a transmitter signal at a set of frequency offsets from a set of transmitter channels associated with a set of transmitter channel wavelengths. The set of transmitter channels may include a first channel being associated with a first quantity of bandwidth and a second channel associated with a second quantity of bandwidth. The first quantity of bandwidth may be different from the second quantity of bandwidth. The device may repeatedly adjust the transmitter signal to align the set of transmitter channel wavelengths based on a set of observed responses to the set of tones, generated based on the transmitter signal passing through an optical filter, failing to match a set of expected responses.

12 Claims, 13 Drawing Sheets

(56) References Cited

U.S. PATENT DOCUMENTS

2009/0232493 A1* 9/2009 Tu .................. H04B 10/572
                                                    398/17
2011/0085794 A1* 4/2011 Lei .................. H04B 10/506
                                                    398/25

OTHER PUBLICATIONS

Wikipedia, "Wavelength-division multiplexing," http://en.wikipedia.org/wiki/Wavelength-division_multiplexing, Sep. 29, 2014, 10 pages.

* cited by examiner

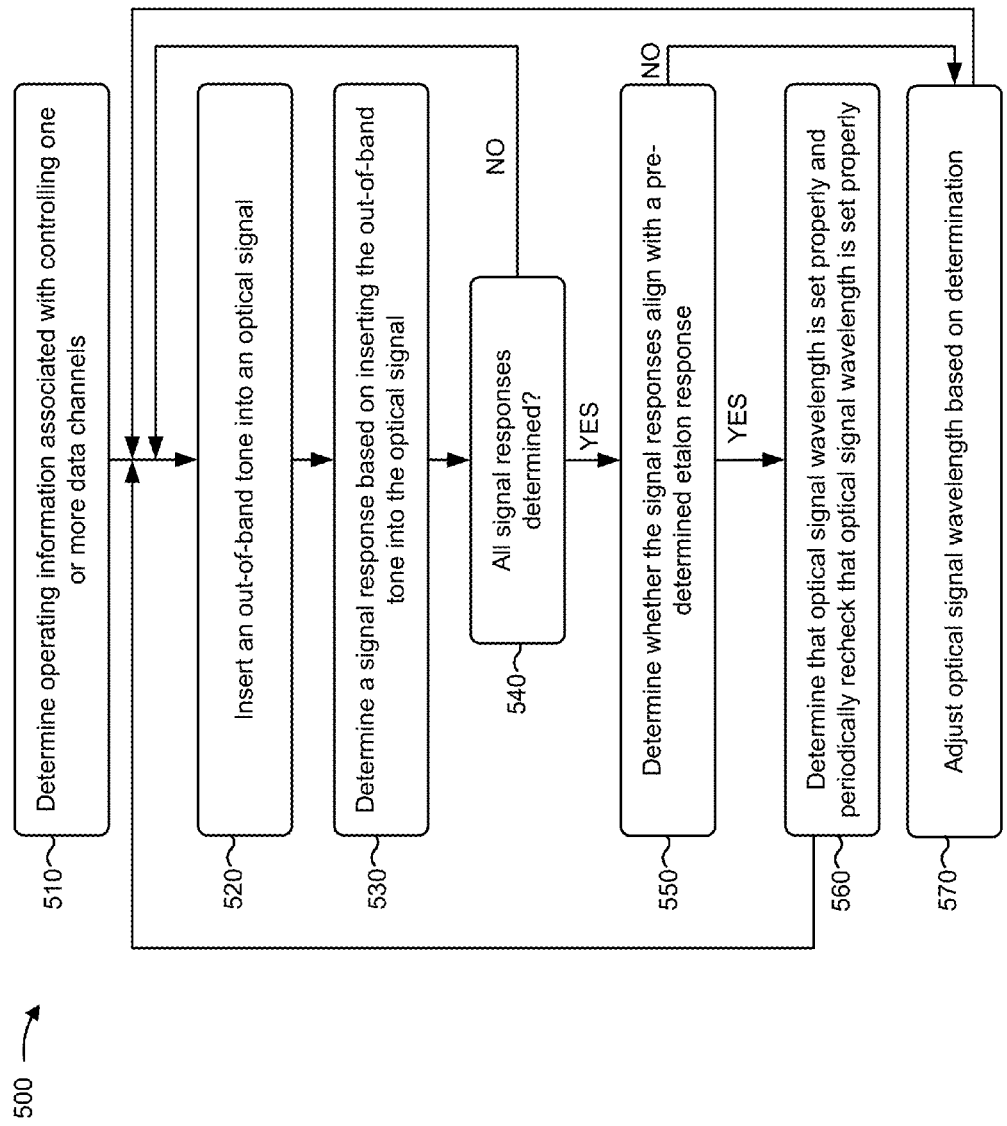

ARBITRARY GRID WAVELOCKING USING DIGITALLY GENERATED OUT-OF-BAND TONES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal). The transmitter component may be configured to utilize a target wavelength for a particular transmission channel, but may actually transmit at a different wavelength. Dual-polarization (DP) (also known as polarization multiplex (PM)) is sometimes used in coherent optical modems. An optical transmitter may be associated with a polarization beam combiner (PBC) that combines two optical signals into a composite DP signal.

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

The optical transmitter (Tx) and the optical receiver (Rx), in an optical communication system, may support communications over a number of wavelength channels. For example, a pair of optical transmitter/receiver may support ten channels, each spaced by, for example, 200 GHz. The set of channels supported by the optical transmitter and the optical receiver can be referred to as a channel grid. Channel grids for the optical transmitter and the optical receiver may be aligned to standardized frequencies, such as those published by the Telecommunication Standardization Sector (ITU-T). The set of channels supported by the optical transmitter and the optical receiver may be referred to as an ITU frequency grid. The set of channels may be aligned to non-standardized frequencies, such as an arbitrary grid that is determined based on network traffic that is to be transmitted and does not correspond to the ITU frequency grid, or the like.

SUMMARY

According to some possible implementations, an optical transmitter may include a controller. The controller may determine one or more operating parameters associated with a quantity of data channels and/or subcarriers being transmitted by a transmitter. The one or more operating parameters may identify one or more target wavelength ranges for the quantity of data channels and/or subcarriers. The controller may cause the transmitter to insert one or more tones into an optical signal based on the one or more operating parameters. The optical signal may have a particular wavelength based on a target wavelength associated with the one or more target wavelength ranges. The optical signal may be output by the transmitter. The one or more tones may be caused to be inserted at a frequency offset from the one or more target wavelength ranges. The controller may determine one or more signal responses based on causing the transmitter to insert the one or more tones into the optical signal. The controller may compare the one or more signal responses to a pre-determined response. The controller may selectively control the particular wavelength of the optical signal to match the target wavelength based on comparing the one or more signal responses to the pre-determined response, to make the one or more signal responses match the pre-determined response.

According to some possible implementations, a system may include an optical transmitter, a detector, an optical filter, and a controller. The controller may identify a data channel for alignment to an expected wavelength range. The controller may instruct the optical transmitter to insert a first tone at a first frequency lower than a lower frequency edge for the data channel and a second tone at a second frequency greater than an upper frequency edge for the data channel into an optical signal associated with the data channel. The controller may compare an observed response to the first tone and the second tone to a set of desired responses to determine whether the optical transmitter is operating at a desired frequency associated with the expected wavelength range. The observed response to the first tone and the second tone may be generated based on the optical signal being attenuated by the optical filter. The controller may selectively control the optical transmitter to align an observed wavelength range associated with the data channel to the expected wavelength range based on determining whether the optical transmitter is operating at the desired frequency.

According to some possible implementations, a device may insert a set of tones into a transmitter signal at a set of frequency offsets from a set of transmitter channels associated with a set of transmitter channel wavelengths. The set of transmitter channels may include a first channel being associated with a first quantity of bandwidth and a second channel associated with a second quantity of bandwidth. The first quantity of bandwidth may be different from the second quantity of bandwidth. The device may repeatedly adjust the transmitter signal to align the set of transmitter channel wavelengths based on a set of observed responses to the set of tones, generated based on the transmitter signal passing through an optical filter, failing to match a set of expected responses.

BRIEF DESCRIPTION OF THE DRAWINGS

FIG. 5 is a flow chart of an example process for controlling an optical transmitter that supports arbitrary grid wavelocking;

DETAILED DESCRIPTION

The following detailed description of example implementations refers to the accompanying drawings. The same reference numbers in different drawings may identify the same or similar elements.

An optical transmitter associated with a wavelength division multiplexed (WDM) optical communication system may transmit multiple optical signals via a single optical communication path using an optical multiplexer circuit. The optical transmitter may provide the multiple optical signals along one or more wavelength channels and/or subcarriers, each having a particular spacing. The optical transmitter may be configured to transmit at a target wavelength, but may actually transmit at a different particular wavelength due to configuration errors, device age, temperature variations, manufacturing errors, or the like. A set of channels may be aligned to standardized frequencies, such as the fixed frequency grid published by the Telecommunication Standardization Sector (ITU-T), by comparing an optical signal to a fixed etalon with a periodicity matching a fixed frequency grid channel spacing (e.g., referred to herein as wavelocking) A temperature sensitive etalon filter may be used to align all channels of a fixed frequency grid channel spacing plan. However, the temperature sensitive etalon filter may be unable to align channels utilizing an arbitrary and/or variable grid channel spacing. Moreover, utilization of a fixed grid may result in underutilization of bandwidth resources. Implementations described herein may utilize a set of out-of-band tones compared against a pre-determined etalon response function to enable a feedback system for wavelocking (e.g., adjusting to align, maintaining, or the like) multiple channels utilizing variable grid channel spacing.

Figure 1A:
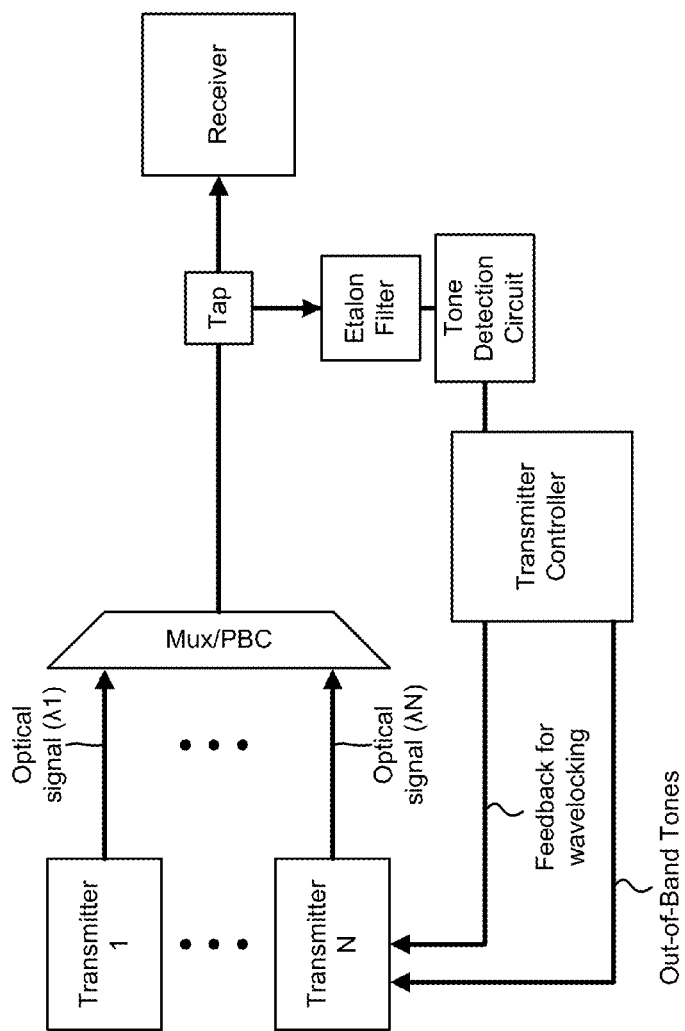
FIGS. 1A-1C are diagrams of an overview of an example implementation described herein.
Figure 1B:
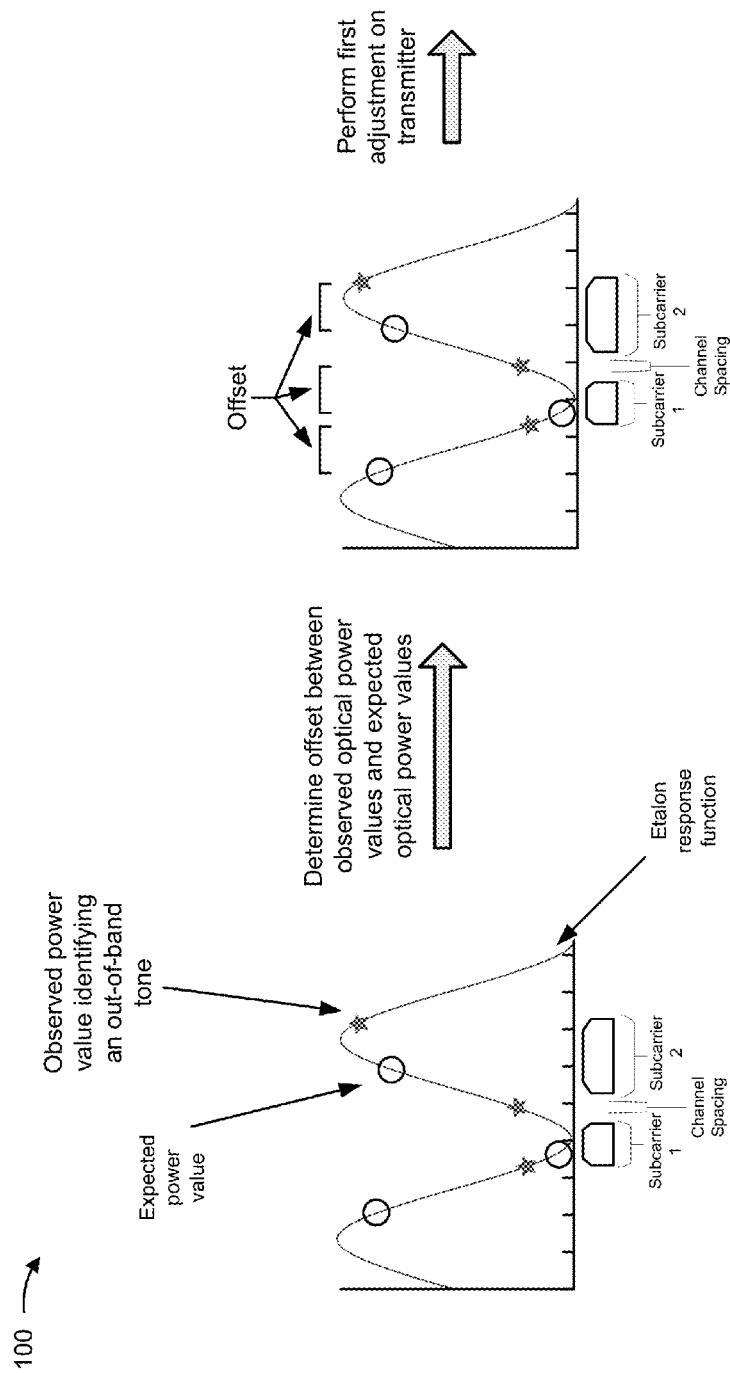
Figure 1C:
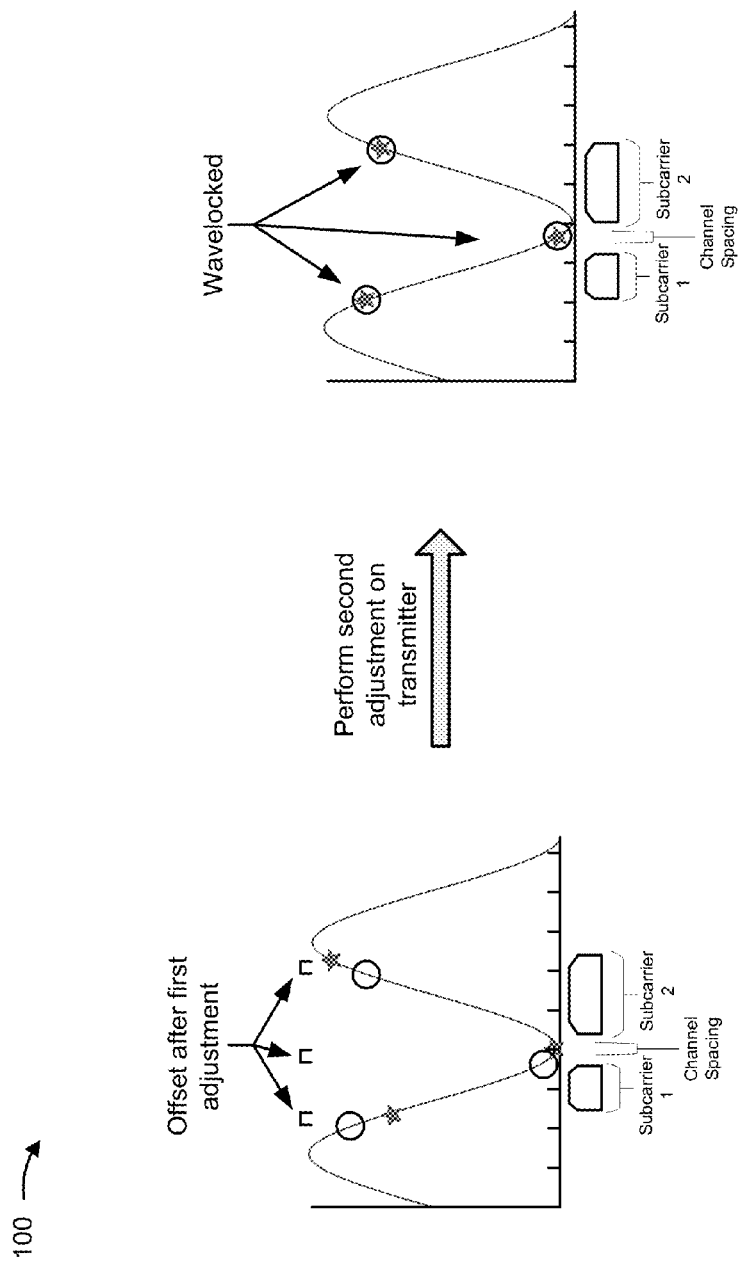

FIGS. 1A-1C are diagrams of an overview of an example implementation 100 described herein. As shown in FIG. 1A, multiple transmitters may transmit multiple optical signals, of different wavelengths to a receiver, via a single optical fiber. Each transmitter may transmit a channel utilizing a particular wavelength range, and there may be a wavelength range of spacing between each channel. Each transmitter may subdivide each channel into one or more subcarriers utilizing particular wavelength ranges and spaced by other particular wavelength ranges.

As further shown in FIG. 1A, a tap (e.g., a network tap), an etalon filter (e.g., an etalon), a tone detection circuit (TDC), and a transmitter controller may be provided with the transmitters. The etalon filter may be used as a stable reference for signals, and may produce a pre-determined etalon response function based on an optical signal passing through the etalon filter. The pre-determined etalon response function may refer to an expected attenuation of the optical signal when the optical signal is passed through the etalon filter. For example, when an optical signal utilizing a particular wavelength is filtered by an etalon filter, an expected attenuation may occur. The transmitter controller may provide feedback for wavelocking (e.g., to align a transmitter to a target wavelength, to maintain a transmitter at a target wavelength, etc.), and may provide information instructing the transmitters to insert one or more out-of-band tones to perform wavelocking.

As shown in FIG. 1B, assume that a particular transmitter generates a particular optical signal divided into two subcarriers, each with a target wavelength range and a different bandwidth allocation. The particular transmitter may insert a set of out-of-band tones at frequencies surrounding a set of target wavelength ranges. For example, a first out-of-band tone may be inserted at a first frequency lower than the lower edge of a first subcarrier target wavelength range, a second out-of-band tone may be inserted at a second frequency greater than the greater edge of the first subcarrier target wavelength range and lower than the lower edge of a second subcarrier target wavelength range, and a third out-of-band tone may be inserted at a third frequency greater than the greater edge of the second subcarrier target wavelength range. In so doing, a particular set of tones (e.g., signals) may provide markers designating edges of a particular subcarrier wavelength range and/or a particular channel wavelength range.

As further shown in FIG. 1B, assume that a tap provides a portion of the particular optical signal to the etalon, and the TDC may detect an optical power passing through the etalon. The TDC may obtain a power value (e.g., an optical power value associated with an amount of photo-current on a photodiode) associated with a particular out-of-band tone. For example, the etalon and the TDC may provide, to the transmitter controller, information identifying observed power values, such as a first power value associated with the first out-of-band tone, a second power value associated with the second out-of-band tone, and a third power value associated with a third out-of-band tone.

As further shown in FIG. 1B, the transmitter controller may compare the observed power values with expected power values (e.g., the transmitter controller may compare an observed response to passing the particular optical signal through the etalon filter with an expected response). For example, the transmitter controller may plot the observed power values against the expected power values. Both the observed power values and the expected power values may correspond to the etalon response function. The transmitter controller may determine an offset between the observed power values and the expected power values. When the observed power values corresponding to the out-of-band tones do not align with the expected power values, the transmitter controller may determine that the actual wavelength range of the optical signal is misaligned with the target wavelength range of the optical signal. Based on this determination, the transmitter controller may cause the transmitter to repeatedly adjust the optical signal.

As shown in FIG. 1C, by inserting another set of out-of-band tones, another offset is determined between the observed power values and the expected power values. The transmitter controller may repeatedly provide information adjusting the transmitter until the observed power values align with the expected power values (e.g., until an observed response aligns with an expected response), thereby aligning each actual wavelength range with a corresponding target wavelength range. In so doing, the transmitter may utilize optical bandwidth according to a determined arbitrary wavelength grid. Furthermore, the transmitter may maintain wavelocking based on a particular feedback loop indicating when an actual wavelength range for an optical signal being generated by the transmitter is misaligned with a target wavelength range for the optical signal.

In this way, a transmitter utilizing a subcarrier and/or channel associated with an arbitrary wavelength range may select out-of-band tones to be provided and detected, and may adjust a configuration to wavelock to a target wavelength range based on comparing a signal response for out-of-band tones to a pre-determined etalon response (e.g., a pre-determined and/or expected response to an etalon filter). Furthermore, an arbitrary quantity of channels and/or subcarriers may be wavelocked by adjusting the quantity of out-of-band tones to be used.

Figure 2:
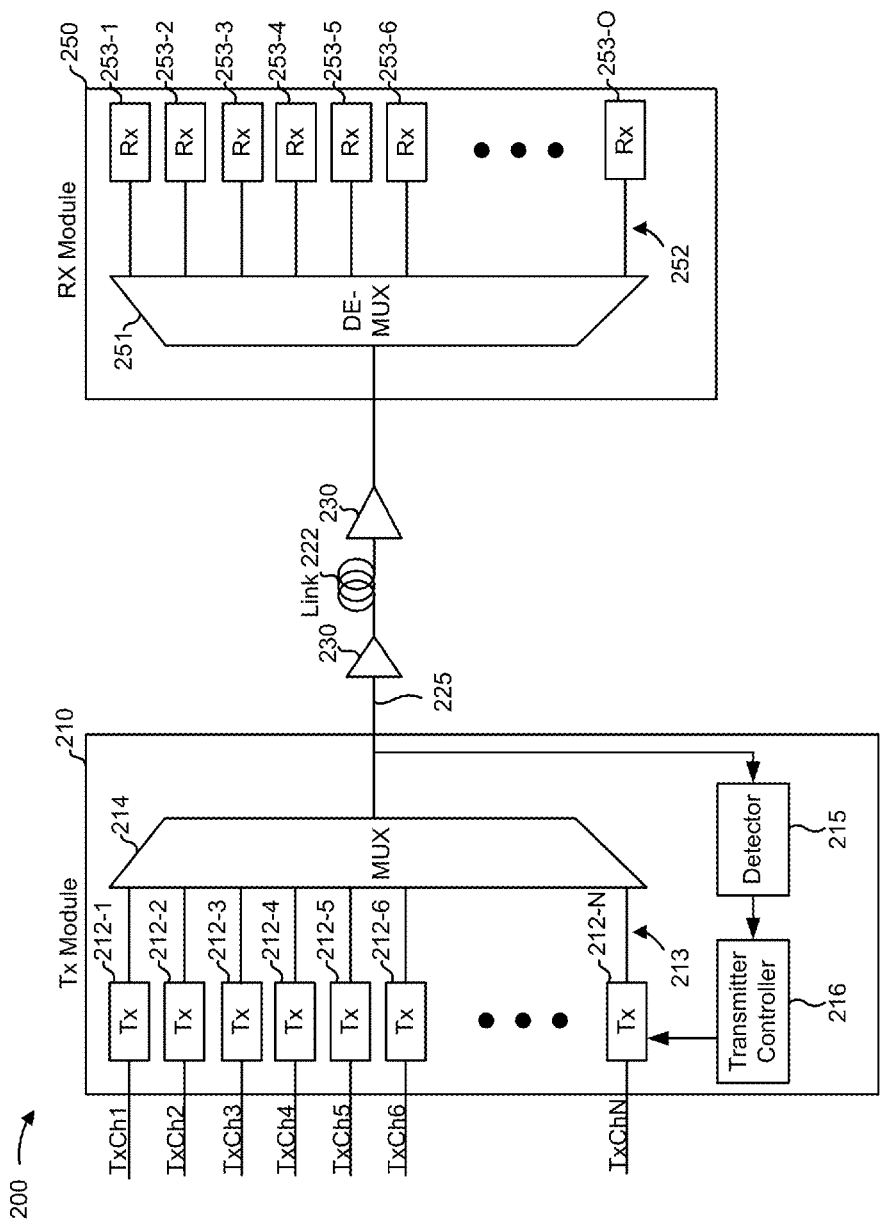
FIG. 2 is a diagram of an example network in which systems and/or methods, described herein, may be implemented.

FIG. 2 is a diagram of an example network 200 in which systems and/or methods, described herein, may be implemented. As shown in FIG. 2, a network may include transmitter module 210 (e.g., a transmitter (Tx) photonic integrated circuit (PIC)) and/or receiver module 250 (e.g., a receiver (Rx) PIC). In some implementations, transmitter module 210 may be optically connected to receiver module 250 via link 222 and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (N≥1), waveguides 213, optical multiplexer 214, detector 215, and/or transmitter controller 216. Each optical transmitter 212 may receive a data channel (TxCh1 through TxChN), may modulate the data channel with an optical signal, and may transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. In some implementations, each optical transmitter 212 may modulate the optical signals (e.g., according to a modulation format) based on control signals provided by transmitter controller 216. The control signals may include a signal instructing optical transmitter 212 to lock one or more wavelengths of the optical signals and/or a signal instructing optical transmitter 212 to adjust one or more wavelengths of the optical signals.

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225. In some implementations, optical multiplexer 214 may be associated with a polarization beam combiner (PBC).

Detector 215 may include one or more devices that detect an optical signal and output an electrical signal based on the detected optical signal. In some implementations, detector 215 may output a particular electrical signal based on a filtered version of the detected optical signal. In some implementations, detector 215 may include a tone detection circuit utilizing a photodiode configured to determine an optical power value at a particular frequency based on receiving an optical signal including an out-of-band tone. In some implementations, detector 215 may include an etalon filter that produces a pre-determined frequency response function. The etalon filter may be configured according to a set of parameters, such as free-spectral range, extinction ratio, or the like. In some implementations, the etalon filter may be a temperature sensitive etalon filter, and the pre-determined frequency response function may be adjusted when a temperature associated with the etalon filter is adjusted.

Transmitter controller 216 may include one or more devices that provide, to one or more devices within transmitter module 210, signals that control conditions associated with an optical signal generated by transmitter module 210. In some implementations, transmitter controller 216 may be separate from and external to transmitter module 210. In some implementations, transmitter controller 216 may be implemented as a processor, a microprocessor, an ASIC, an FPGA, or the like. In some implementations, transmitter controller 216 may monitor and/or control optical signals generated by transmitter 212, and may adjust the optical signals based on comparing one or more out-of-band tones inserted therein against a pre-determined etalon response function.

As further shown in FIG. 2, receiver module 250 may include optical demultiplexer 251, waveguides 252, and/or optical receivers 253-1 through 253-O (O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photo-detectors and/or related devices to receive respective input optical signals outputted by optical demultiplexer 251 and a local oscillator, convert the signals to a photocurrent, and provide a voltage output to function as an electrical signal representation of the original input signal.

The number and arrangement of devices shown in FIG. 2 are provided for explanatory purposes. In practice, there may be additional devices, fewer devices, different devices, or differently arranged devices than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of network 200 may perform one or more functions described as being performed by another one or more of the devices of network 200.

Figure 3:
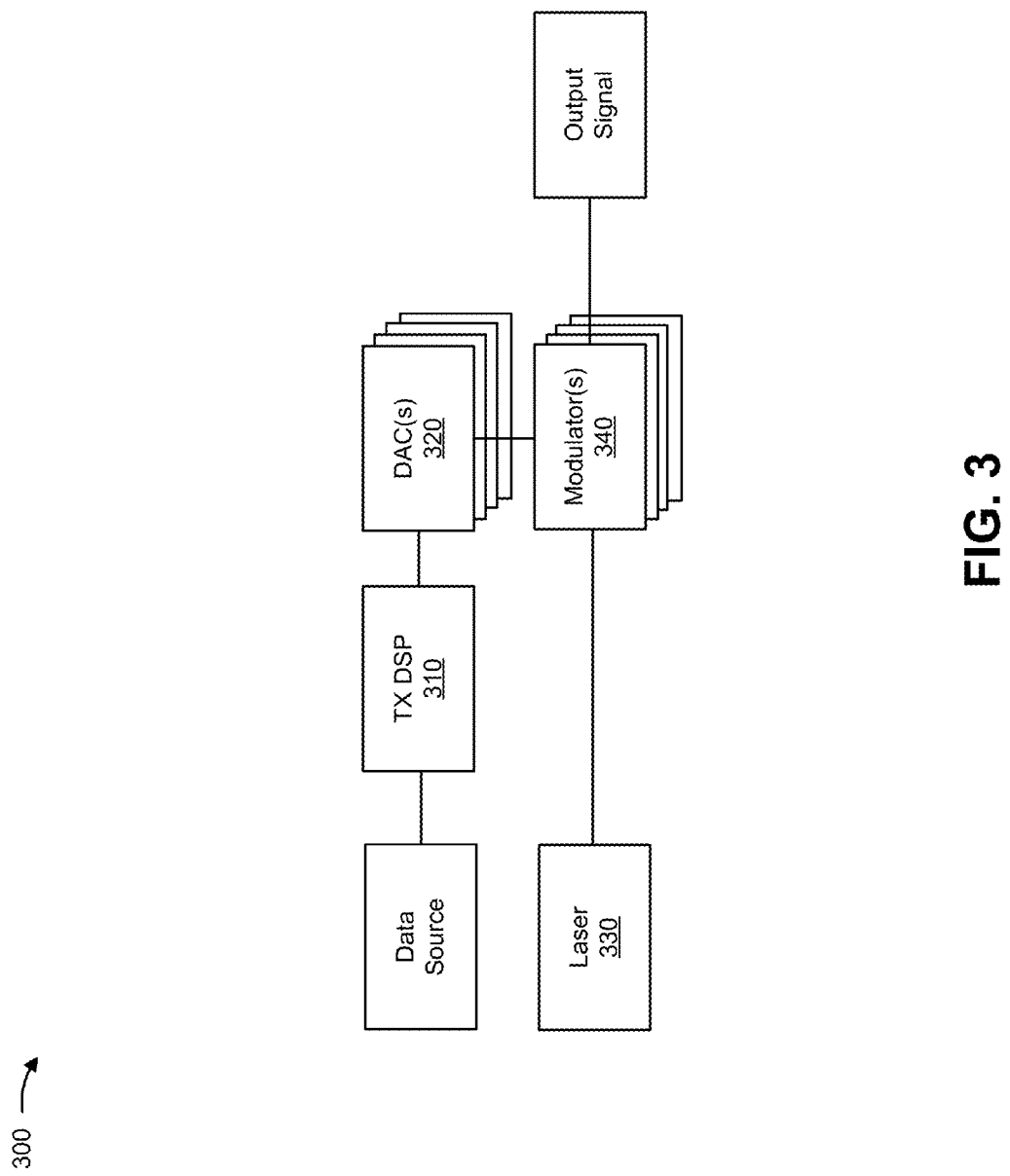
FIG. 3 is a diagram of example components of an optical transmitter shown in FIG. 2.

FIG. 3 is a diagram of example components of optical transmitter 212 shown in network 200 of FIG. 2. As shown in FIG. 3, optical transmitter 212 may include a Tx digital signal processor (DSP) 310, one or more digital-to-analog converters (DACs) 320, a laser 330, and one or more modulators 340. In some implementations, Tx DSP 310, DACs 320, laser 330, and/or modulators 340 may be implemented on one or more integrated circuits, such as one or more PICs, one or more application specific integrated circuits (ASICs), or the like. In some implementations, components of multiple optical transmitters 212 may be implemented on a single integrated circuit, such as a single PIC, to form a super-channel transmitter.

Tx DSP 310 may include a digital signal processor or a collection of digital signal processors. In some implementations, Tx DSP 310 may receive a data source (e.g., a signal received via a Tx channel), may process the signal, and may output digital signals having symbols that represent components of the signal (e.g., an in-phase x-polarization component, a quadrature x-polarization component, an in-phase y-polarization component, and a quadrature y-polarization component). In some implementations, Tx DSP 310 may receive control signals from transmitter controller 216 and/or may include transmitter controller 216.

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, transmitter module 212 may include multiple DACs 320, where a particular DAC 320 may correspond to a particular polarization (e.g., an x-polarization, a y-polarization) of a signal and/or a particular component of a signal (e.g., an in-phase component, a quadrature component).

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 214.

In some implementations, optical transmitter 212 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 214) and polarization multiplexing.

The number and arrangement of components shown in FIG. 3 are provided as an example. In practice, optical transmitter 212 may include additional components, fewer components, different components, or differently arranged components than those shown in FIG. 3. For example, the quantity of DACs 320, lasers 330, and/or modulators 340 may be selected to implement an optical transmitter 212 that is capable of generating polarization diverse signals for transmission on an optical fiber, such as link 222. Additionally, or alternatively, a set of components shown in FIG. 3 may perform one or more functions described herein as being performed by another set of components shown in FIG. 3.

Figure 4:
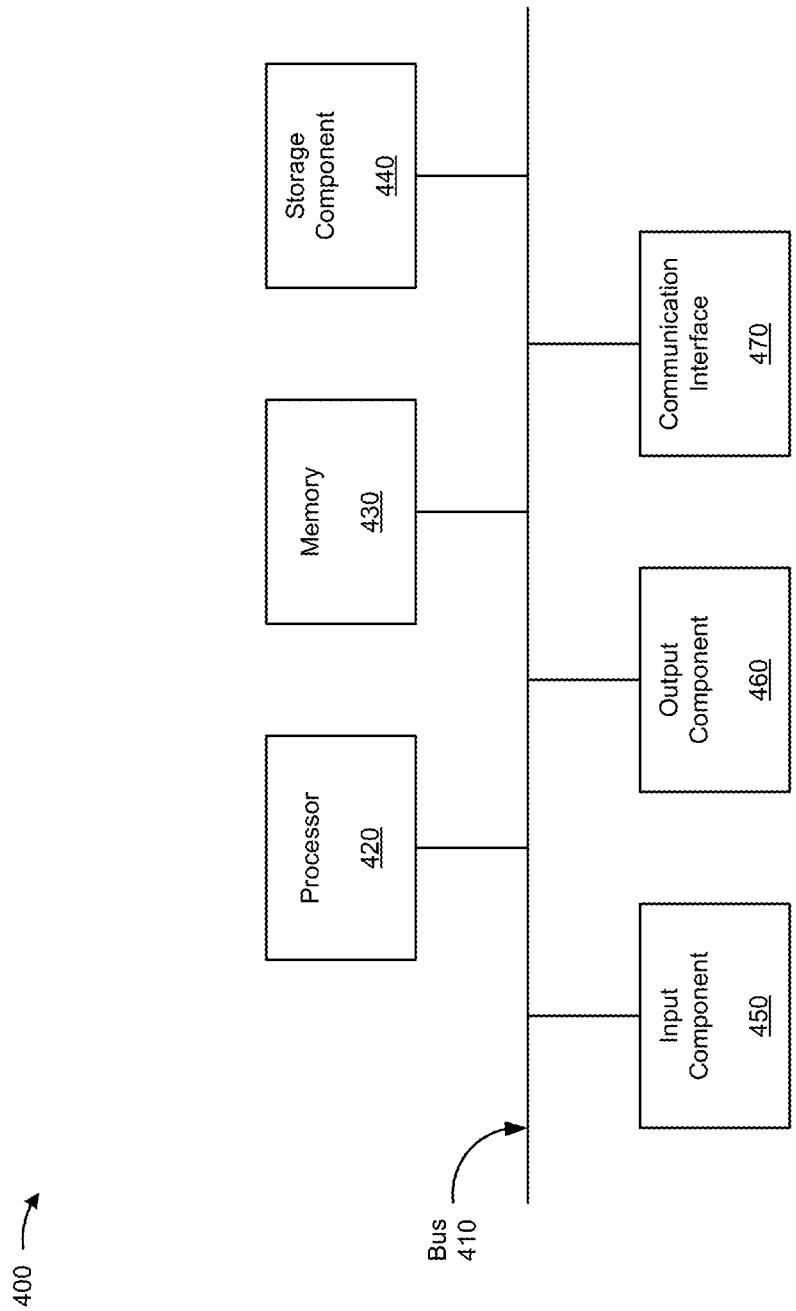
FIG. 4 is a diagram of example components of one or more devices of FIG. 2.

FIG. 4 is a diagram of example components of a device 400. Device 400 may correspond to detector 215, transmitter controller 216, and/or another device of network 200. In some implementations, detector 215, transmitter controller 216, and/or another device of network 200 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, an electrically erasable programmable read-only memory (EEPROM), and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.), a network interface (e.g., a command-line interface, a web interface), or the like. Additionally, or alternatively, input component 450 may include a sensor for sensing information (e.g., a global positioning system (GPS) component, an accelerometer, a gyroscope, an actuator, a photo-detector etc.). Output component 460 may include a component that provides output information from device 400 (e.g., a display, a speaker, one or more light-emitting diodes (LEDs), a command-line interface, a web interface, etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for controlling an optical transmitter that supports arbitrary grid wavelocking. In some implementations, one or more process blocks of FIG. 5 may be performed by transmitter module 210 (e.g., transmitter 212, detector 215, transmitter controller 216, etc.). In some implementations, one or more process blocks of FIG. 5 may be performed by another component or a group of components separate from or including transmitter module 210, such as receiver module 250, or the like.

As shown in FIG. 5, process 500 may include determining operating information associated with controlling one or more data channels (block 510). For example, transmitter controller 216 of transmitter module 210 may determine one or more target wavelengths associated with the one or more channels (e.g., data channels) and/or one or more subcarriers. In some implementations, transmitter controller 216 may receive, from a user, information indicating a particular wavelength range for each particular channel and/or subcarrier of a set of channels and/or subcarriers. Additionally, or alternatively, transmitter controller 216 may determine different wavelength ranges for each particular channel of the set of channels. For example, transmitter controller 216 may determine that a first channel should utilize a first wavelength range, and that a second channel should utilize a second wavelength range. In some implementations, transmitter controller 216 may determine a quantity of channels. For example, when an amount of network traffic that is to be transmitted via transmitter module 210 satisfies a threshold, transmitter controller 216 may determine a particular quantity of channels and/or subcarriers to be utilized. Additionally, or alternatively, transmitter controller 216 may determine spacing (e.g., channel spacing) associated with the channels and/or subcarriers. For example, transmitter controller 216 may determine that a first channel and a second channel are to be spaced by a particular wavelength range, and may determine that the second channel and a third channel are to be spaced by another particular wavelength range (which may be the same or different from the particular wavelength range).

As further shown in FIG. 5, process 500 may include inserting an out-of-band tone into an optical signal (block 520). For example, transmitter controller 216 of transmitter module 210 may instruct transmitter 212 of transmitter module 210 to generate and insert the out-of-band tone into the optical signal. An out-of-band tone may refer to a digital signal, an optical signal, or the like, generated by transmitter module 210 at a frequency corresponding to an edge of a wavelength range for a channel and/or subcarrier. For example, transmitter module 210 may generate a particular out-of-band tone as a particular modulated wave, such as a sinusoidal wave (e.g., a sine wave, a cosine wave, etc.), or the like, to be inserted into the optical signal being transmitted by transmitter module 210. In some implementations, transmitter module 210 may insert the out-of-band tone intermittently. For example, transmitter module 210 may generate a set of pulsed signals, and may insert the set of pulsed signals into the optical signal according to a time function. In some implementations, transmitter controller 216 may instruct Tx DSP 310 to insert the out-of-band tone into the optical signal for transmitter 212.

In some implementations, transmitter controller 216 may instruct transmitter 212 to insert multiple out-of-band tones into the optical signal. For example, transmitter 212 may digitally insert a first out-of-band tone at a first frequency, a second out-of-band tone at a second frequency, and a third out-of-band tone at a third frequency. In this way, transmitter module 210 may determine wavelocking for multiple subcarriers, multiple channels, or the like, concurrently.

Transmitter controller 216 may instruct transmitter 212 to insert the out-of-band tone at a particular frequency based on a target wavelength for a channel and/or subcarrier. For example, for a first channel at a first target wavelength range centered around 1552.93 nanometers (nm) (i.e., 193.05 terahertz (THz)) and a second channel at a second target wavelength range centered around 1552.12 nm (i.e., 193.15 THz), transmitter module 210 may insert a first out-of-band tone at 193.00 THz (e.g., a first frequency lower than a lower edge for a first frequency range associated with the first target wavelength range), a second out-of-band tone at 193.10 THz (e.g., a second frequency in a spacing between the first frequency range and a second frequency range associated with the second target wavelength range), and a third out of band tone at 193.20 THz (e.g., a third frequency greater than the greater edge for the second frequency range). In this way, transmitter module 210 may include a set of out-of-band tones at a set of edge frequencies for the first target wavelength range and the second target wavelength range.

As further shown in FIG. 5, process 500 may include determining a signal response based on inserting the out-of-band tone into the optical signal (block 530). For example, detector 215 of transmitter module 210 may record an increased optical power value (e.g., increased with respect to a baseline optical power associated with the optical signal prior to insertion of the out-of-band tone), and may determine that the increased optical power is associated with the out-of-band tone. In some implementations, a photodiode associated with detector 215 may detect the increased optical power (e.g., a power value).

As further shown in FIG. 5, process 500 may include determining whether all signal responses are determined (block 540). For example, transmitter module 210 may determine whether a signal response has been determined for each out-of-band tone inserted into the optical signal. In some implementations, transmitter module 210 may require a particular quantity of signal responses for the channels and/or subcarriers. For example, transmitter module 210 may require n+1 signal responses (e.g., power values) for n channels and/or subcarriers that transmitter module 210 is transmitting. In this way, transmitter module 210 may determine a set of upper frequency bounds and a set of lower frequency bounds for a set of wavelength ranges associated with a set of channels and/or subcarriers.

As further shown in FIG. 5, if all signal responses are not determined (block 540—NO), process 500 may include returning to block 520. For example, for alignment of a one channel, two subcarrier optical signal, transmitter module 210 may, upon detecting two power values (e.g., associated with a first out-of-band tone and a second out-of-band tone) insert a third out-of-band tone to determine a third power value, as described herein with respect to process block 520 and process block 530.

As further shown in FIG. 5, if all signal responses are determined (block 540—YES), process 500 may include determining whether the signal responses align with a pre-determined etalon response (block 550). For example, transmitter controller 216 of transmitter module 210 may determine whether the signal responses (e.g., a set of power values) align with an expected etalon response (e.g., an expected set of power values). A power value may be associated with an optical power and a frequency. The pre-determined etalon response may refer to a pre-determined attenuation caused by a transmission passing through an etalon filter resulting in an output of optical power as a function of frequency.

In some implementations, transmitter controller 216 may generate a graph of the signal responses and the pre-determined etalon response. For example, transmitter controller 216 may plot one or more power values and the pre-determined etalon response to determine whether the power values align with the pre-determined etalon response (e.g., indicating that transmitter controller 216 is wave-locked with the target wavelength range). In some implementations, transmitter controller 216 may determine whether the one or more power values match the pre-determined etalon response based on a threshold matching level. For example, transmitter controller 216 may determine, based on a least squares fit, or another technique, that the extent to which power values align with the pre-determined etalon response satisfies a matching threshold, and may determine that the power values match the pre-determined etalon function based on the matching threshold being satisfied.

In some implementations, transmitter controller 216 may store and/or recall a graph to/from a memory or storage device (e.g., a flash memory, a hard-disk drive, or random access memory). For example, transmitter controller 216 may recall a previously constructed graph of the pre-determined etalon response and a previous set of power values to determine one or more parameters associated with aligning the actual wavelength range of the optical signal to the target wavelength range.

In some implementations, if transmitter controller 216 determines that the signal responses do not align with the pre-determined etalon response, transmitter controller 216 may determine that an actual wavelength range of the optical signal is incorrect and needs to be adjusted to provide the optical signal at the target wavelength. Additionally, or alternatively, if transmitter controller 216 determines that the signal responses align with the pre-determined etalon response, transmitter controller 216 may determine that the actual wavelength range of the optical signal is the target wavelength range, thereby indicating that transmitter 212 is accurately wavelocked.

As further shown in FIG. 5, if the signal responses align with the pre-determined etalon response, process 500 may include determining that the optical signal wavelength is set properly and periodically rechecking that the optical signal wavelength is set properly (block 560). For example, if transmitter controller 216 determines that a set of power values match with the pre-determined etalon response, transmitter controller 216 may determine that the optical signal wavelength is set properly, and may lock the target wavelength of a particular transmitter 212 associated with the optical signal. In some implementations, transmitter controller 216 may wait a particular interval, and may recheck the wavelength of optical signals associated with the particular transmitter 212 by re-inserting out-of-band tones as described herein with respect to process block 520.

As further shown in FIG. 5, if the signal responses do not align with the pre-determined etalon response, process 500 may include adjusting the optical signal wavelength based on the determination and returning to process block 520 (block 570). For example, when transmitter controller 216 determines that the signal responses do not align with the pre-determined etalon response (e.g., a set of power values do not intersect with a graph of the pre-determined etalon response), transmitter controller 216 may adjust transmitter 212 to align the actual wavelength range with the target wavelength range. In some implementations, transmitter controller 216 may adjust transmitter 212 by adjusting a temperature associated with transmitter 212.

In some implementations, transmitter controller 216 may decrease a particular wavelength range for the optical signal until the signal response aligns with the pre-determined etalon response. For example, when the target frequency is 193.75 THz and the signal responses indicate an actual frequency of 193.70 THz (e.g., indicating that transmitter 212 is outputting the optical signal at a lower than designed frequency), transmitter controller 216 may increase the output frequency above 193.75 THz to account for the lower than designed frequency output (e.g., thereby decreasing the wavelength range). Additionally, or alternatively, transmitter module 210 may increase a particular target wavelength of the optical signal until the signal response aligns with the pre-determined etalon response.

In some implementations, transmitter controller 216 may wait a particular interval, and may recheck the wavelength of the optical signal by re-inserting out-of-band tones as described herein with respect to process block 520.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. Although portions of process 500 are described in the context of creating and using a graph, in some implementations, transmitter module 210 may perform portions of process 500 without actually creating and/or using a graph. For example, transmitter module 210 may perform the portions of process 500 by generating and/or using the information (e.g., the values) contained in the graph.

FIGS. 6A-6E are diagrams of an example implementation 600 relating to example process 500 shown in FIG. 5. FIGS. 6A-6E show an example of controlling an optical transmitter that supports arbitrary grid wavelocking.

Figure 6A:
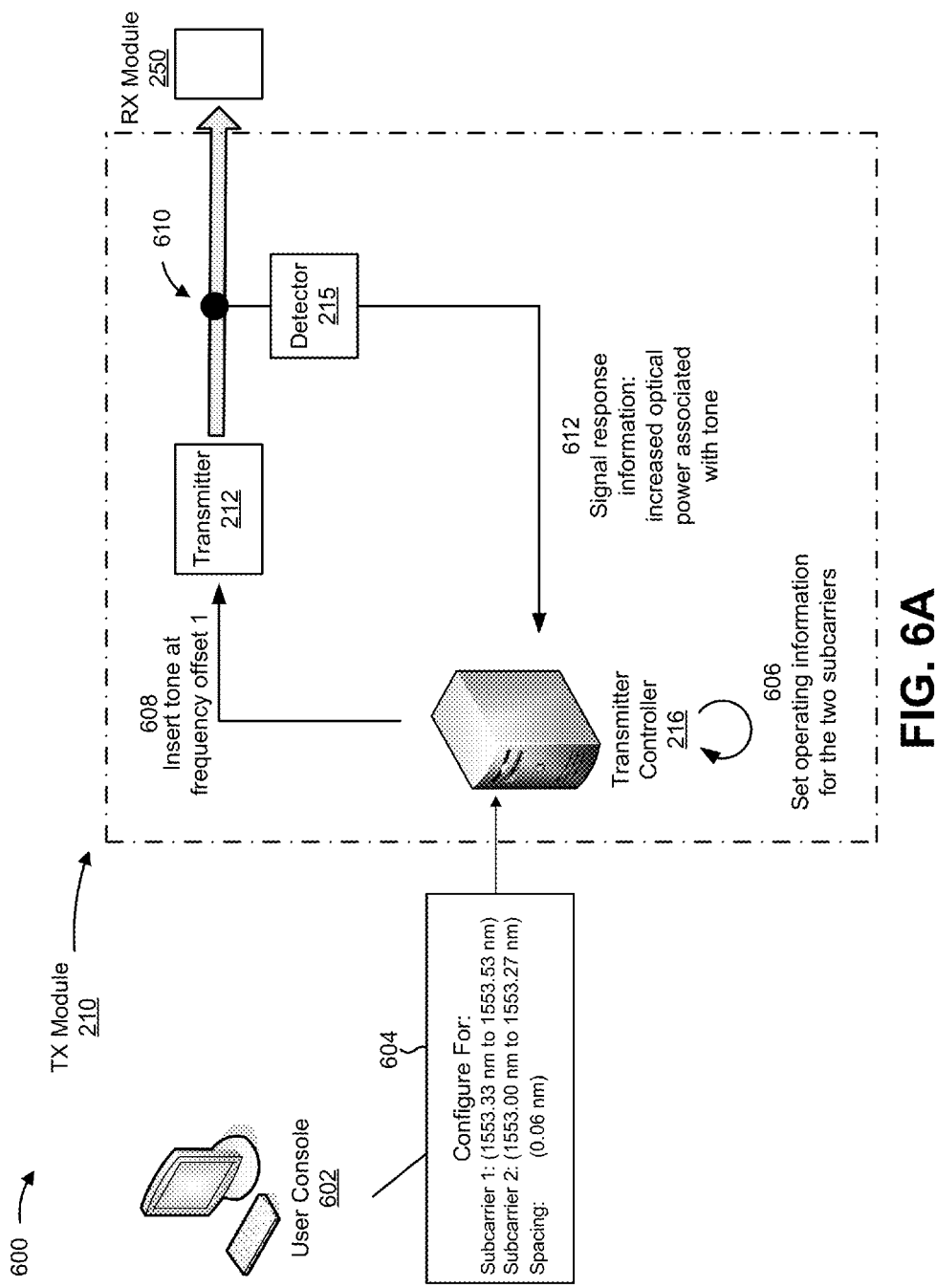
FIGS. 6A-6E are diagrams of an example implementation relating to the example process shown in FIG. 5.

As shown in FIG. 6A, a user may utilize user console 602 to configure transmitter module 210 with one or more configuration parameters. As shown by reference number 604, transmitter controller 216 of transmitter module 210 receives information associated with configuring an optical signal (e.g., an indication that transmission module 210 is to be configured to provide a channel including a first subcarrier associated with a first target wavelength range of 1553.33 nm to 1553.53 nm, a second subcarrier associated with a second target wavelength range of 1553.00 nm to 1553.27 nm, and a spacing between the first subcarrier and the second subcarrier of 0.06 nm). Transmitter controller 216 may determine, based on the one or more configuration parameters, that the first subcarrier is associated with a first target frequency range of 192.98 THz through 193.00 THz, that the second subcarrier is associated with a second target frequency range of 193.01 THz through 193.04 THz, and that the first subcarrier and the second subcarrier are spaced by a frequency range of 193.00 THz through 193.01 THz. As shown by reference number 606, transmitter controller 216 sets operating information for transmitter 212 based on the information from user console 602.

As further shown in FIG. 6A, and by reference number 608, transmitter controller 216 instructs transmitter 212 to insert a tone (e.g., an out-of-band tone) at a first frequency offset. Assume that the first frequency offset is a frequency lower than the lower edge of the first subcarrier of the two subcarriers (e.g., at 192.97 THz). As shown by reference numbers 610 and 612, detector 215 monitors an optical signal being provided by transmitter 212 to receiver module 250, and provides signal response information to transmitter controller 216. Assume the signal response information indicates a first power value associated with the tone inserted at the first frequency offset.

Figure 6B:
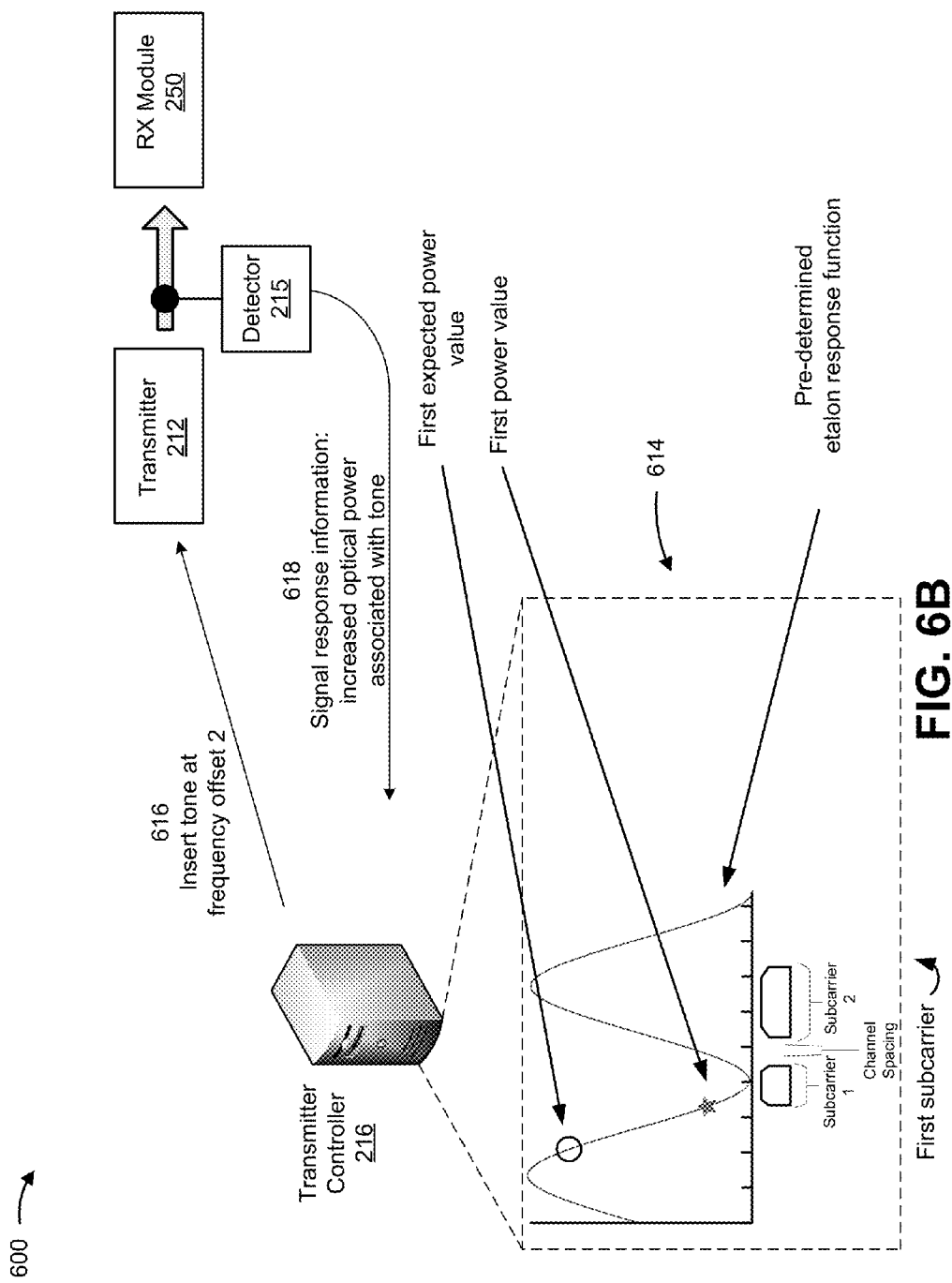

As shown in FIG. 6B, and by reference number 614, transmitter controller 216 plots an indication of the first power value against an expected power value corresponding to a pre-determined etalon response function. As shown by reference number 616, transmitter controller 216 instructs transmitter 212 to insert another tone at a second frequency offset. Assume that the second frequency offset is a frequency between the two subcarriers (e.g., at 193.005 THz). As shown by reference number 618, transmitter controller 216 receives signal response information (e.g., from detector 215). Assume the signal response information indicates a second power value associated with the tone inserted at the second frequency offset.

Figure 6C:
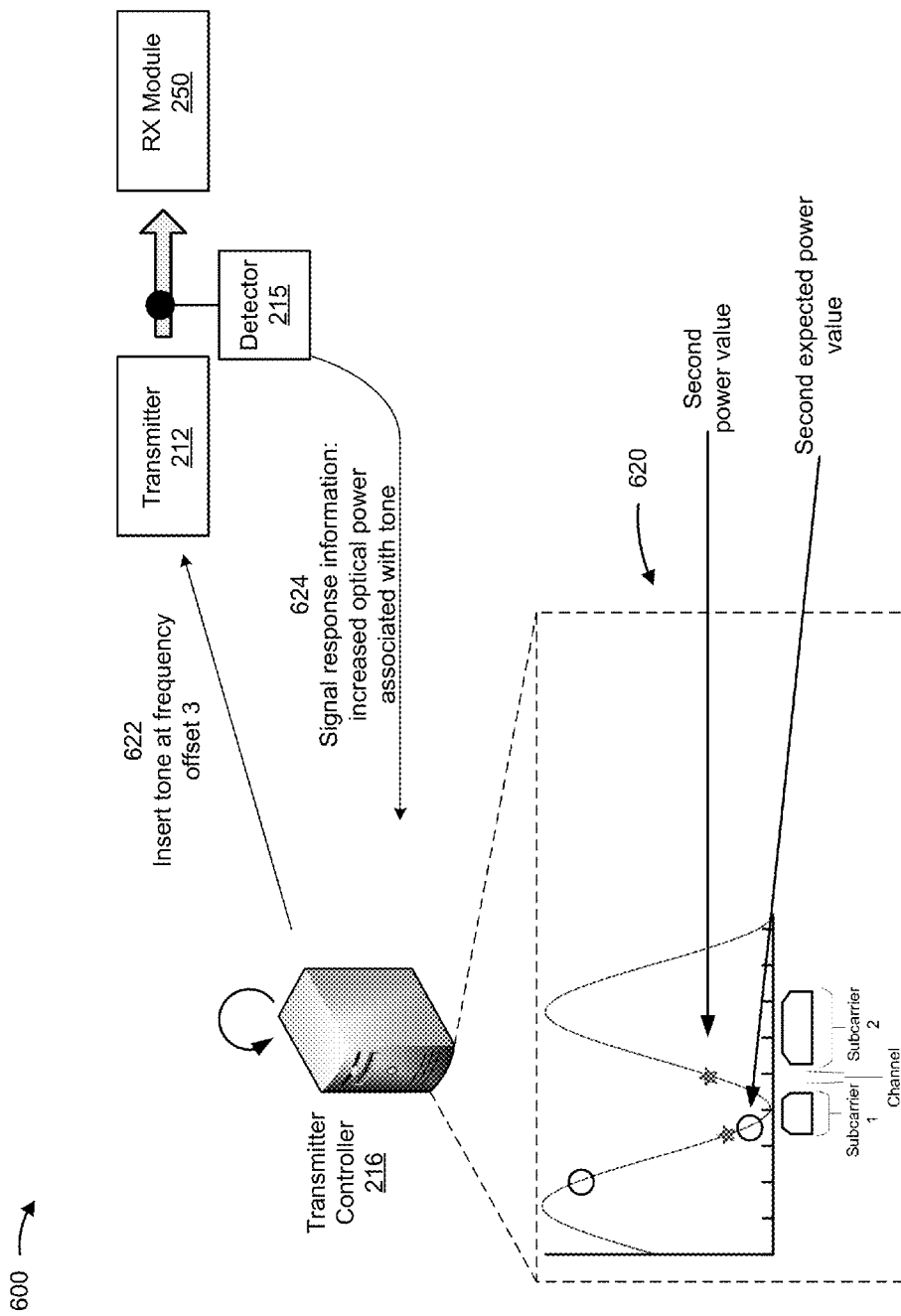

As shown in FIG. 6C, and by reference number 620, transmitter controller 216 plots an indication of the second power value against another expected power value. As shown by reference number 622, transmitter controller 216 instructs transmitter 212 to insert another tone at a third frequency offset. Assume that the third frequency offset is a frequency greater than the greater edge of the second subcarrier (e.g., at 193.05 THz). As shown by reference number 624, transmitter controller 216 receives signal response information (e.g., from detector 215). Assume the signal response information indicates a third power value associated with the tone inserted at the third frequency offset.

Figure 6D:
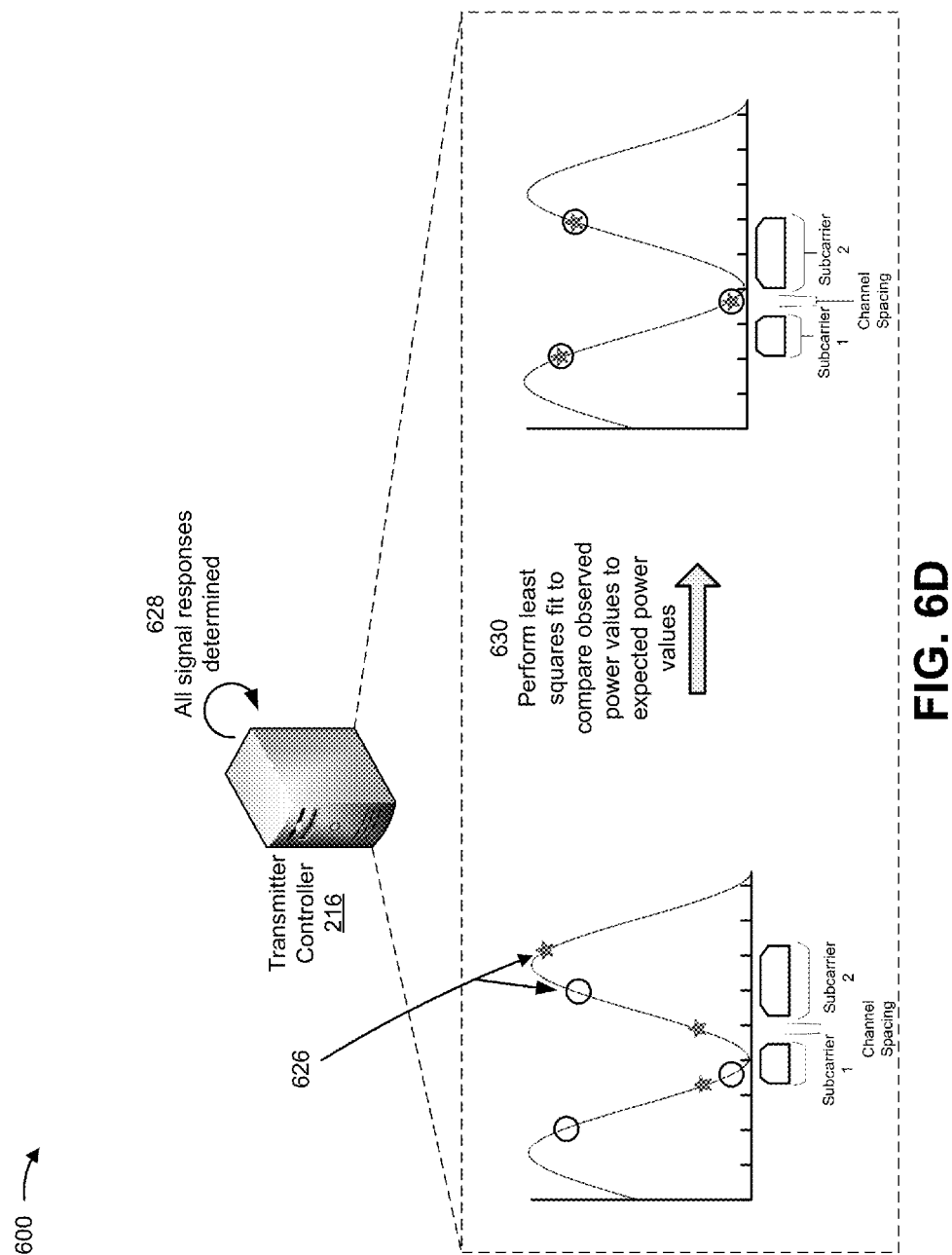

As shown in FIG. 6D, and by reference number 626, transmitter controller 216 plots an indication of the third power value against another expected power value. As shown by reference number 628, transmitter controller 216 determines that all signal responses have been determined. As shown by reference number 630, transmitter controller 216 performs a least squares fit to compare the signal responses (e.g., the observed power values) to the expected responses (e.g., associated with the expected power values). Assume that transmitter controller 216 determines that the optical signal must be adjusted for the signal responses to align with the expected power values.

Figure 6E:
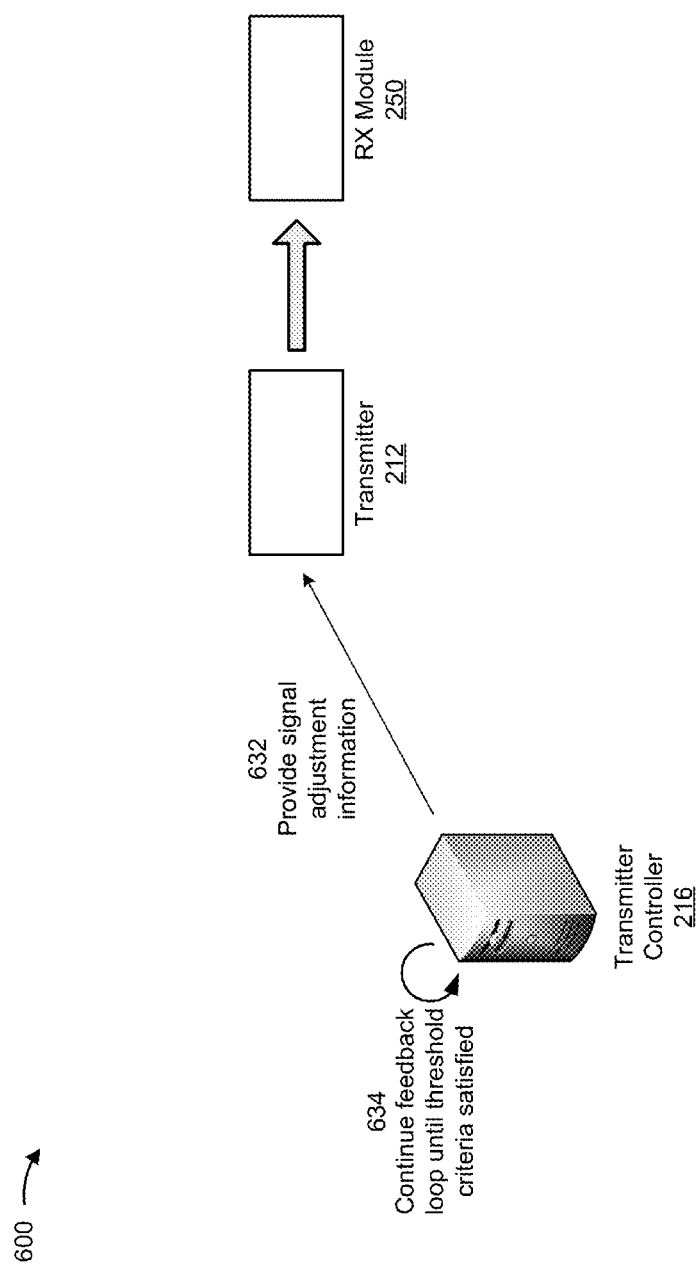

As shown in FIG. 6E, and by reference number 632, transmitter controller 216 provides signal adjustment information to transmitter 212 associated with adjusting an optical signal for transmitter 212 to align the actual wavelength range at which transmitter 212 provides the optical signal (e.g., as identified based on comparing the signal responses to the expected responses) with the target wavelength range intended by the user (e.g., as identified in the one or more configuration parameters). For example, transmitter controller 216 may cause a temperature adjustment for transmitter 212 to align the actual wavelength range to the target wavelength range. As shown by reference number 634, transmitter controller 216 may continue a feedback loop of inserting tones and providing signal adjustment information until a threshold criteria for alignment is satisfied.

As indicated above, FIGS. 6A-6E are provided merely as an example. Other examples are possible and may differ from what was described with regard to FIGS. 6A-6E.

Figure 7:
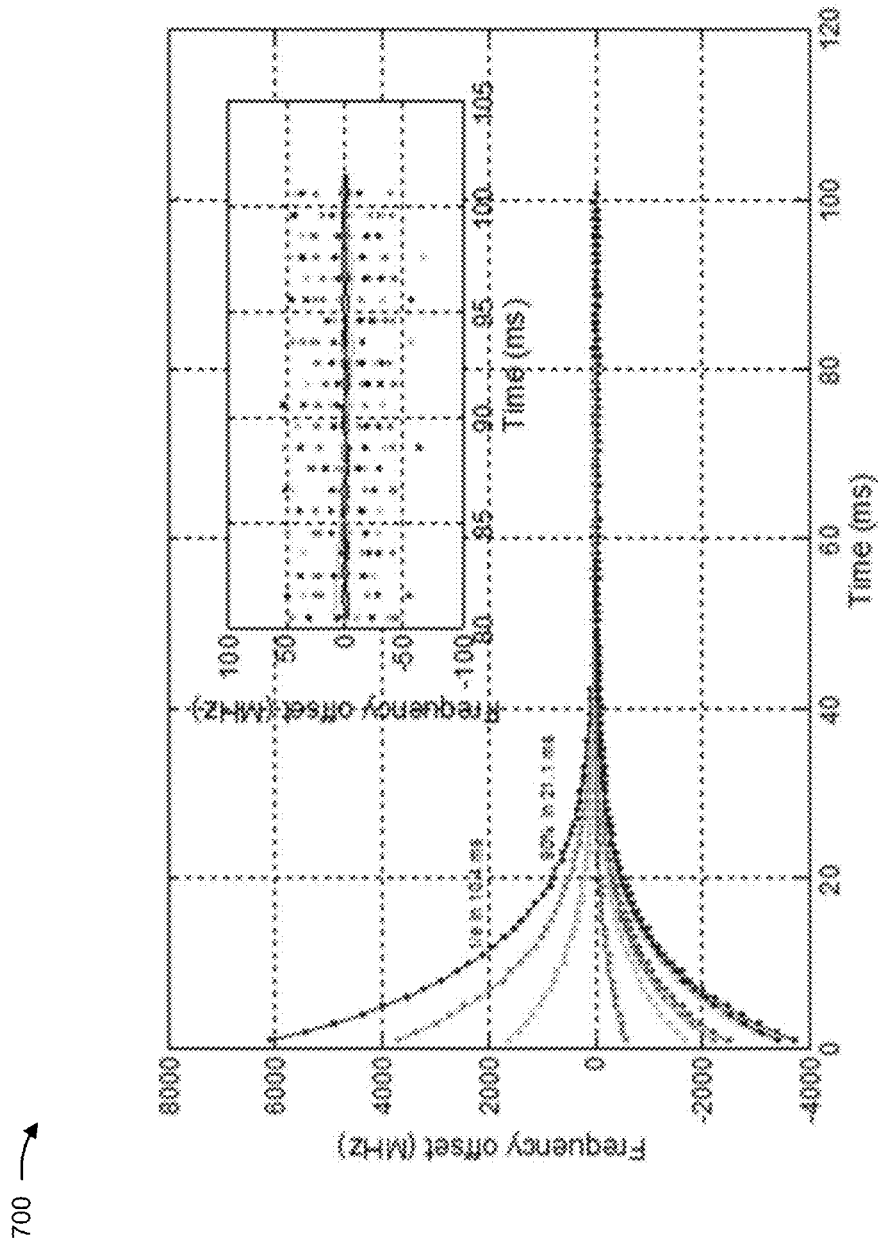
FIG. 7 is a diagram of an example simulation relating to the example process shown in FIG. 5.

FIG. 7 is a diagram of an example simulation 700 relating to example process 500 shown in FIG. 5. FIG. 7 shows an example simulation of controlling an optical transmitter that supports arbitrary grid wavelocking.

As shown in FIG. 7, possible results are shown for a simulation for two subcarrier wavelocking with a subcarrier baud rate at 8.3 GHz, and an etalon free-spectral range of 18.75 GHz. Ten individual channels, represented by each set of graph points, have frequency offsets from the desired arbitrary grid (e.g., frequency offsets from target transmission frequencies), and a simulated control is used to adjust transmitters providing the ten individual channels onto the desired arbitrary grid (e.g., represented by a 0 value on the y-axis "Frequency offset"). As further shown in FIG. 7, the feedback loop controls the frequency offsets resulting in wavelocking to an error rate less than 50 MHz at 80 milliseconds (ms) (e.g., as indicated by the call-out graph therein displayed).

As indicated above, FIG. 7 is provided merely as an example. Other examples are possible and may differ from what was described with regard to FIG. 7.

In this way, multiple channels and/or subcarriers may be wavelocked to an arbitrary target wavelength range by comparing inserted out-of-band tones to a pre-determined etalon response in a feedback loop.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical transmitter, comprising:
a controller configured to:
determine one or more operating parameters associated with a quantity of data channels and/or subcarriers being transmitted by a transmitter,
the one or more operating parameters identifying one or more target wavelength ranges for the quantity of data channels and/or subcarriers;
cause the transmitter to insert one or more tones into an optical signal based on the one or more operating parameters,
the optical signal having a particular wavelength based on a target wavelength associated with the one or more target wavelength ranges,
the optical signal being output by the transmitter,
the one or more tones being caused to be inserted at a frequency offset from the one or more target wavelength ranges;
determine one or more signal responses based on causing the transmitter to insert the one or more tones into the optical signal;
compare the one or more signal responses to a pre-determined response; and
selectively control the particular wavelength of the optical signal to match the target wavelength based on comparing the one or more signal responses to the pre-determined response, to make the one or more signal responses match the pre-determined response.

2. The optical transmitter of claim 1, where the pre-determined response corresponds to an attenuation associated with an etalon response function; and
where the controller, when comparing the one or more signal responses to the pre-determined response, is further configured to:
compare the one or more signal responses to the etalon response function.

3. The optical transmitter of claim 1, where the controller, when comparing the one or more signal responses to the pre-determined response, is further configured to:
perform a least squares fit for the one or more signal responses and the pre-determined response;
determine that the least squares fit does not satisfy a matching threshold; and
where the controller, when selectively controlling the particular wavelength of the optical signal, is further to:
adjust the particular wavelength of the optical signal based on determining that the least squares fit does not satisfy the matching threshold.

4. The optical transmitter of claim 1, where the controller, when comparing the one or more signal responses to the pre-determined response, is further configured to:
determine that the one or more signal responses match the pre-determined response; and
where the controller, when selectively controlling the particular wavelength of the optical signal, is further to:
maintain the particular wavelength of the optical signal;
wait a particular quantity of time; and
insert one or more additional tones into the optical signal to determine one or more additional signal responses based on the one or more additional tones, compare the one or more additional signal responses to the pre-determined response, and selectively control the optical signal based on comparing the one or more additional signal responses to the pre-determined response.

5. The optical transmitter of claim 1, where the controller is further configured to:
adjust the particular wavelength of the optical signal, to create an adjusted optical signal, based on determining that the one or more signal responses do not match the pre-determined response.

6. The optical transmitter of claim 5, where, when comparing the one or more signal responses to the pre-determined response, the controller is further configured to:
determine that the particular wavelength is less than the target wavelength; and
where, when adjusting the particular wavelength of the optical signal, the controller is further configured to:
increase the particular wavelength of the adjusted optical signal.

7. The optical transmitter of claim 1, where the pre-determined response corresponds to an etalon response function; and
where, when comparing the one or more signal responses to the pre-determined response, the controller is further configured to:
plot the one or more signal responses against the etalon response function;
determine an offset between the one or more signal responses and the pre-determined response based on plotting the one or more signal responses against the etalon response function; and
where, when selectively controlling the particular wavelength of the optical signal, the controller is further configured to:
selectively control the particular wavelength of the optical signal based on determining the offset between the one or more signal responses and the pre-determined response.

8. A method, comprising:
inserting, by a device, a set of tones into a transmitter signal at a set of frequency offsets from a set of transmitter channels associated with a set of transmitter channel wavelengths,
the set of transmitter channels including a first channel being associated with a first quantity of bandwidth and a second channel associated with a second quantity of bandwidth,
the first quantity of bandwidth being different from the second quantity of bandwidth; and
repeatedly adjusting, by the device, the transmitter signal to align the set of transmitter channel wavelengths based on a set of observed responses to the set of tones, generated based on the transmitter signal passing through an optical filter, failing to match a set of expected responses,
where repeatedly adjusting the transmitter signal further comprises:
performing a least squares fit for the set of observed responses and the set of expected responses;

determining a misalignment between the set of observed responses and the set of expected responses based on the least squares fit; and repeatedly adjusting the transmitter signal based on the misalignment.

9. The method of claim 8, further comprising:

receiving operating information associated with determining a set of target wavelengths for the set of transmitter channel wavelengths associated with the set of transmitter channels; and where repeatedly adjusting the transmitter signal further comprises:

repeatedly adjusting the transmitter signal to align the set of transmitter channel wavelengths to the set of target wavelengths.

10. The method of claim 8, where repeatedly adjusting the transmitter signal further comprises one of:

increasing a particular transmitter channel wavelength of the set of transmitter channel wavelengths; or decreasing a particular transmitter channel wavelength of the set of transmitter channel wavelengths.

11. A method, comprising:

inserting, by a device, a set of tones into a transmitter signal at a set of frequency offsets from a set of transmitter channels associated with a set of transmitter channel wavelengths, the set of transmitter channels including a first channel being associated with a first quantity of bandwidth and a second channel associated with a second quantity of bandwidth, the first quantity of bandwidth being different from the second quantity of bandwidth; and repeatedly adjusting, by the device, the transmitter signal to align the set of transmitter channel wavelengths based on a set of observed responses to the set of tones, generated based on the transmitter signal passing through an optical filter, failing to match a set of expected responses, where inserting the set of tones further comprises:

causing a first tone to be inserted at a first frequency offset associated with a particular transmitter channel of the set of transmitter channels, the first frequency offset being a frequency less than a bandwidth range associated with the transmitter channel; and causing a second tone to be inserted at a second frequency offset associated with the particular transmitter channel, the second frequency offset being a frequency greater than the bandwidth range associated with the transmitter channel.

12. The method of claim 8, where the transmitter signal is one of:

an optical data channel; or an optical subcarrier.

* * * * *